US009092333B2

(12) United States Patent
Phan et al.

(10) Patent No.: US 9,092,333 B2
(45) Date of Patent: Jul. 28, 2015

(54) FAULT ISOLATION WITH ABSTRACTED OBJECTS

(71) Applicant: International Business Machines Corporation, Armonk, NY (US)

(72) Inventors: Christopher Tung Phan, Rochester, MN (US); Zane Coy Shelley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 13/734,094

(22) Filed: Jan. 4, 2013

(65) Prior Publication Data

US 2014/0195845 A1 Jul. 10, 2014

(51) Int. Cl.
*G06F 11/00* (2006.01)
*G06F 11/07* (2006.01)
*G06F 11/22* (2006.01)

(52) U.S. Cl.
CPC ........ *G06F 11/0793* (2013.01); *G06F 11/0724* (2013.01); *G06F 11/22* (2013.01)

(58) Field of Classification Search
CPC .. G06F 11/0724; G06F 11/0793; G06F 11/22
USPC .......................................................... 714/48
See application file for complete search history.

(56) References Cited

U.S. PATENT DOCUMENTS

| 4,441,075 | A | * | 4/1984 | McMahon ..................... 714/731 |
| 4,494,066 | A | * | 1/1985 | Goel et al. ..................... 714/726 |
| 4,503,386 | A | * | 3/1985 | DasGupta et al. ............. 714/731 |
| 4,509,008 | A | * | 4/1985 | DasGupta et al. ............. 714/731 |
| 5,216,672 | A | | 6/1993 | Tatosian et al. |
| 5,606,568 | A | | 2/1997 | Sudweeks |
| 6,501,690 | B2 | | 12/2002 | Satoh |
| 6,708,302 | B1 | | 3/2004 | Shibayama et al. |
| 7,055,118 | B1 | * | 5/2006 | Kamepalli et al. ............ 716/107 |
| 7,899,641 | B2 | | 3/2011 | Fleury et al. |
| 8,032,806 | B1 | | 10/2011 | Tabatabaei |
| 8,081,529 | B2 | | 12/2011 | Pyeon |

FOREIGN PATENT DOCUMENTS

| JP | 60244135 | 12/1985 |
| JP | 01096898 | 4/1989 |
| JP | 07110790 | 4/1995 |
| JP | 2011141140 | 7/2011 |

* cited by examiner

*Primary Examiner* — Joshua P Lottich
(74) *Attorney, Agent, or Firm* — DeLizio Gilliam, PLLC

(57) ABSTRACT

In response to a notification of a fault captured in a system, a fault isolator serially analyzes each clock object to determine captured faults associated with the clock object. For each of the clock objects determined to have a captured fault, the fault isolator initiates a repair action for the chip represented by the clock object. The fault isolator concurrently analyzes the non-clock objects to determine captured faults associated with the non-clock objects after analysis of the clock objects. For each of the non-clock objects determined to have a captured fault, the fault isolator initiates a repair action for the chip represented by the non-clock object.

20 Claims, 3 Drawing Sheets

FAULT ISOLATION WITH ABSTRACTED OBJECTS

BACKGROUND

Embodiments of the inventive subject matter generally relate to the field of computer systems, and, more particularly, to computer chip error analysis and diagnosis.

A complex computer system (e.g., server system) can have numerous hardware nodes (e.g., multi-processor module, blade server, server board, etc.), each of which has hundreds of chips ("system chips")—processor chips, memory chips, and input/output chips. These complex computer systems have been created in response to increasing computing demands. But systems must meet the computing demands while also meeting customer demands of reliability, availability, and serviceability. The increased complexity to satisfy increased computing demands is at odds with these customer demands. During initial program load (IPL) or run time, one or more system chips may report multiple errors (also referred to as faults) that require diagnosis and repair actions to keep the system up and running. Diagnosis of a fault is referred to as fault isolation, which identifies an origin of a fault in order to make repairs if possible.

SUMMARY

Embodiments of the inventive subject matter include an apparatus that comprises a plurality of chips, and a service processor. The service processor is configured to generate, for each of the plurality of chips, a clock object and a non-clock object. The clock object indicates at least one of data and program code for clock related functionality of the chip and the non-clock object indicates at least one of data and program code for functionality of the chip that is not related to clock functionality. In response to a notification of a fault captured in the apparatus, the service processor is configured to serially analyze each of the clock objects to determine captured faults associated with the clock objects. For each of the clock objects determined to have a captured fault, the service processor is configured to initiate a repair action for the chip represented by the clock object. The service processor is configured to concurrently analyze the non-clock objects to determine captured faults associated with the non-clock objects after analysis of the clock objects. For each of the non-clock objects determined to have a captured fault, a repair action is initiated for the chip represented by the non-clock object.

Embodiments of the inventive subject matter include receiving notification of a fault in a system having a plurality of chips. In response to the notification, each of a first plurality of clock objects is serially analyzed for indications of faults captured in the system and, for each of the first plurality of clock objects with an indication of a captured fault, a repair action defined for the captured fault and the chip of the plurality of chips represented by the clock object is initiated. The first plurality of clock objects represents clock aspects of a first set of the plurality of chips. Each of a second plurality of clock objects is serially analyzed for indications of faults captured in the system and, for each of the second plurality of clock objects with an indication of a captured fault, a repair action defined for the captured fault and the chip of the plurality of chips represented by the clock object is initiated. The second plurality of clock objects represents non-clock aspects of a second set of the plurality of chips. The first plurality of clock objects is serially analyzed prior to the second plurality of clock objects. After analysis of the clock objects, non-clock objects are concurrently analyzed for indications of captured faults. For each of the non-clock objects with an indication of a captured fault, a repair action defined for the captured fault and for the chip represented by the non-clock object is initiated.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

As system complexity increases (e.g., with increasing numbers of nodes and system chips per node), system chip error analysis and diagnosis ("fault isolation") can become less efficient. The speed and efficiency of fault isolation affect system reliability. Single threaded, serialized fault isolation can be inefficient, and impact system performance since system resources are spent on fault isolation for a longer duration.

Abstracting system chips into clock objects and non-clock objects allows for efficient fault isolation in these systems with large numbers of system chips and accommodate variance in fault reporting time. When a fault occurs, fault isolation program code and/or hardware components ("fault isolator") can take a different approach based on object type. First, the fault isolator serially analyzes clock objects corresponding to the fault. Faults arising from clock functionality or phase lock loop (PLL) operation ("clock related fault") can echo or propagate to other objects. Even in a system designed to record an indication of a first fault ("capture a fault"), which causes other faults, timing of fault reporting may not align with timing of fault capturing (i.e., a second captured fault may be reported before the first captured fault). Inspecting the clock objects serially before non-clock objects prevents reporting time from improperly influencing fault isolation. The fault isolator can also analyze clock objects in accordance with a priority defined for the type of chip ("chip domain") associated with the clock object. If the fault isolator does not identify any of the clock objects as an origin of the fault, then the fault isolator proceeds with concurrently analyzing non-clock objects. The fault isolator can also prioritize the concurrent analysis of non-clock objects in accordance with priorities of corresponding chip domains. Delaying the concurrent analysis until clock object analysis has finished gives the fault isolator an opportunity to clear a fault before expanding resources for parallel analysis. But the transition to concurrent analysis speeds up the fault isolation after the fault isolator determines that the fault is a not clock related.

Figure 1:
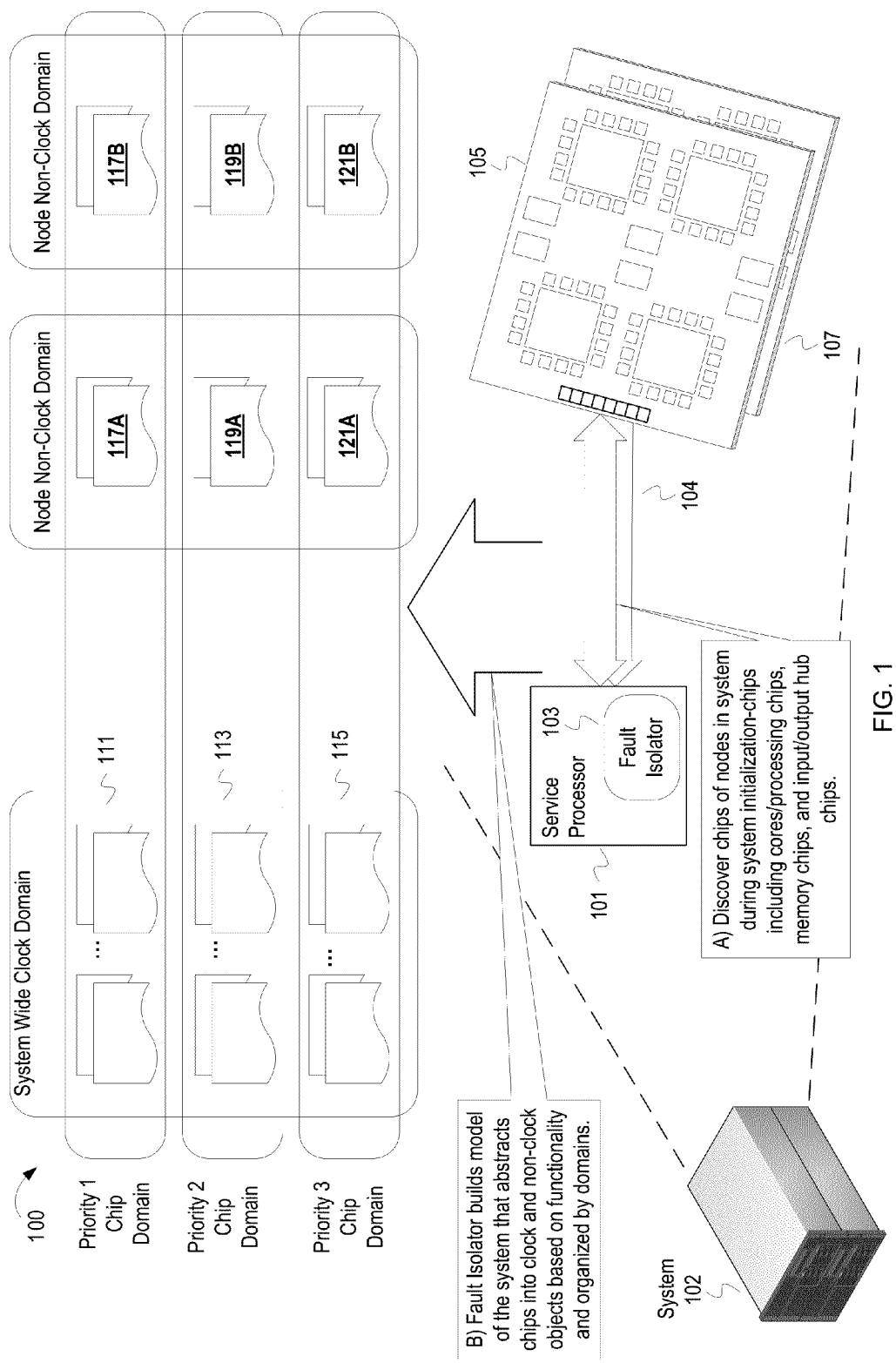
FIG. 1 depicts a conceptual diagram of an example system that abstracts chips into clock and non-clock objects for fault isolation.

FIG. 1 depicts a conceptual diagram of an example system that abstracts chips into clock and non-clock objects for fault isolation. In FIG. 1, a system 102 includes a service processor 101, a node 105, a node 107, and a bus(es) 104 connecting the service processor 101 to the nodes 105, 107. For FIG. 1, each of the nodes 105, 107 is depicted as an integrated circuit package with a unifying substrate and four processors, any one of which may be a multi-core processor. Each of the nodes 105, 107 also has memory chips, input/output hub chips, and fault registers. Although not depicted, each of the IC packages also includes fault checking hardware (referred to herein as "checkers") that monitors lines, buses, memory, etc. for faults. When a fault is detected by one of these checkers, the checker writes to a corresponding one of the fault registers. Each register is associated with a particular one of the checkers, and each of the checkers is associated with a particular chip. Within each of the fault registers, a bit position or set of bit positions ("fault register field") is designated to indicate a fault for a particular aspect of a chip. For example, a bit or set of bits of a fault register may be designated for indicating a fault detected in the arithmetic logic unit of one of the processors.

The service processor 101 is a separately powered microprocessor, separate from the nodes 105, 107. The service processor 101 surveys/monitors the system 102 in conjunction with the checkers. As an example of service processor functionality, the service processor 101 can provide surveillance for various management modules, such as a virtual machine manager or hardware management console, environmental monitoring, reset and boot features, and remote maintenance and diagnostic activities.

As part of system initialization, the service processor assists in performing a number of different tests on the nodes 105, 107. Examples of these tests include Built-in-Self-Tests (BIST) for both logic components and memory arrays, wire tests, component initialization, and operating system (OS) diagnostic routines. The BISTs deal with the internal integrity of components. The service processor 101 assists in performing the BISTs, which are capable of detecting errors within components. These tests can be run for fault determination and isolation, whether or not system processors are operational, and they may find faults not otherwise detectable by processor-based Power-on-Self-Test (POST) or diagnostics. Wire tests discover and precisely identify connection faults between components (e.g., between processors and memory or I/O hub chips). Component initialization includes initializing memory, typically by writing patterns of data and storing valid error-correcting code (ECC) for each location (and detecting faults through this process). Finally, a set of OS diagnostic routines will be employed during an OS IPL stage to both configure external devices and to confirm their correct operation. These tests are primarily oriented to I/O devices (disk drives, PCI adapters, I/O drawers or towers).

The service processor 101 is depicted with a fault isolator 103. The fault isolator 103 represents program code (e.g., firmware) executed by the service processor 101. A fault isolator is not necessarily firmware, and may be implemented with hardware, as a background process running from program code loaded from system memory, etc. The fault isolator 103 embodies the functionality for performing fault isolation, but a fault isolator can be implemented to also perform and/or invoke the testing functionality described for a service processor.

FIG. 1 depicts stages A and B, which example depictions of operations occurring at different points in time. But the example stages are not intended to limit claim scope to two particular stages. The operations depicted in these stages may be implemented over a greater number of stages.

At stage A, the service processor 101 discovers chips of the nodes 105, 107 during initialization of the system 102. The service processor 101 discovers processor chips, memory chips, I/O hub chips, etc. The service processor 101 builds a database for the system based on this discovery. The database identifies each of the chips (e.g., chip identifiers), the components of each chip (e.g., logic component identifiers), and the mapping from chip and/or component to fault register field. The database also identifies which of the chips/components are spare chips/components. The service processor 101 loads indications of repair actions to be taken upon fault detection for each chip and components of the chip. A repair action may be one or more of de-configuring a chip (i.e., removing the chip from service), sparing a chip (i.e., de-configuring a chip and configuring a spare chip as a replacement), configuring a node to modify a component controlled by the node (e.g., reducing available bandwidth of a connection), and generating a service call. The list of example repair actions is not exhaustive. In addition, a repair action may be implemented as program code, message data to be included in a service request, reference data (i.e., pointer), etc. The initialization program code defines the repair actions for the chips, and the service processor 101 builds the database to associate a repair action with a corresponding chip. For example, the service processor 101 sets a repair action pointer in a chip database or loads repair action program code into a chip entry in the database. The service processor 101 also builds the database with information for each chip and chip component that indicates clock related functionality of the chip or chip component, clock related data, non-clock related data, and possibly different repair action based on whether a fault is clock related or not. Designation of data, functionality, or repair action as clock related or non-clock related is done during system design and embodied in program code (e.g., firmware).

At stage B, the fault isolator 103 builds a model 100 of the system based on the database built from discovery during system initialization and organizes the model 100 by domains. The fault isolator 103 abstracts the chips into clock objects and non-clock objects. The fault isolator 103 parses the database for each chip. If a database entry for a chip has data and/or program code that indicates a relationship with clock functionality, then a clock object is created that indicates (referentially or literally) clock related data and/or program code. The information may be duplicated between the database and the model, or elements of the model may refer/index into the database. If the database entry for the chip also has data and/or program code that does not indicate a relationship with clock functionality, then the fault isolator will generate a non-clock object that indicate the non-clock related data and/or program code. Although a chip may be abstracted into a clock object and a non-clock object, not all chips will have this duality. The fault isolator 103 also takes into account the type of chip when organizing the model 100. The fault isolator 103 is configured/programmed to organize the objects into domains defined by the chips (e.g., processor chip domain, memory chip domain, etc.). The different domains have different priority, and the fault isolator 103 analyzes objects in accordance with that priority. Both the domains and the priorities are configurable by a user and/or a configuration file. Organizing the objects does not necessarily mean arranging the objects in a particular order in memory or in data structures. A fault isolator can organize a model by tagging the different objects without ordering the objects. Tagging an object can be implemented with various techniques. As examples, tagging an object may be writing metadata in the object (e.g., writing a chip type or chip identifier), setting a value in a field with defined values that represent the different domains/chip types, instantiating an object as a particular sub-class of the clock or non-clock object class, etc. This does not mean that a fault isolator cannot organize a model by arranging the objects. For example, the model 100 can be instantiated as a data structure with entries designated for each different domain for each type of object. For example, each entry in an array is defined for each domain in order of priority. Each entry references the clock objects and the non-clock objects of the domain. The fault isolator first traverses the array and follows the references to the clock objects. After the clock objects are analyzed, the fault isolator walks the array again, but follows the references to the non-clock objects. As already stated, a variety of implementations are possible for the objects and the model.

The abstractions generated for system 102 are depicted in FIG. 1 as residing in different domains of the model 100. The domains are logical organizations of the objects depicted to help understand the inventive subject matter. Although embodiments are not required to structurally organize objects in accordance with the domains, embodiments will track or indicate the domains for analysis of the objects. The fault isolator 103 generates clock objects across different chip domains of different priorities. Clock objects 111 reside in a first priority chip domain. Clock objects 113 reside in a priority 2 chip domain. Clock objects 115 reside in a priority 3 chip domain. For instance, the Priority 1 Chip Domain, the Priority 2 Chip Domain, and the Priority 3 Chip Domain may respectively correspond to a processing chip domain, a memory chip domain, and an I/O hub chip domain. Building on that example, the clock objects 111 correspond to processor chips; the clock objects 113 correspond to memory chips; the clock objects 115 correspond to I/O hub chips.

The fault isolator 103 also created non-clock objects. The non-clock objects reside in different priority chip domains and different node domains. For node 105, the fault isolator 103 generates non-clock objects 117A, 119A, and 121A. For node 107, the fault isolator 103 generates non-clock objects 117B, 119B, and 121B. The non-clock objects reside in priority chip domains as follows: the non-clock objects 117A and non-clock objects 117B reside in the Priority 1 Chip Domain; the non-clock objects 119A and non-clock objects 119B reside in the Priority 9 Chip Domain; the non-clock objects 121A and non-clock objects 121B reside in the Priority 3 Chip Domain. Although the objects within a particular priority chip domain may correspond to a same type of chip (e.g., all objects in Priority 1 Chip Domain represent processor chips of the system 102), embodiments are not so limited. Priority can be defined by chip or chip component instead of solely chip type. For example, a graphics co-processor may be configured with highest priority for fault isolation, and 1 of 4 general purpose processors in a system is configured with a lower level priority.

Figure 2:
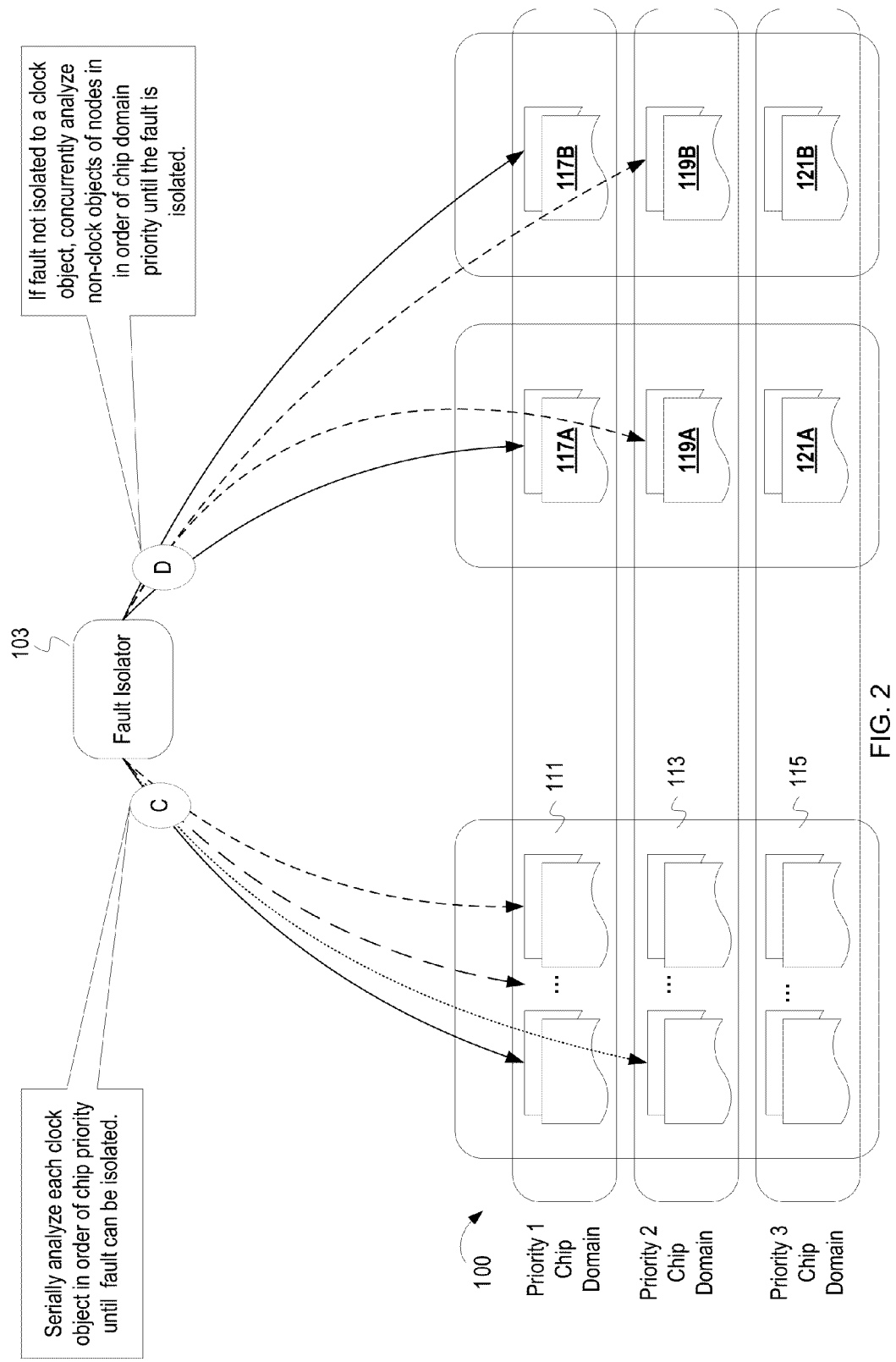
FIG. 2 depicts a conceptual diagram of fault isolation in the example model 100 from FIG. 1.

FIG. 2 depicts a conceptual diagram of fault isolation in the example model 100 from FIG. 1. In FIG. 2, a fault is presumed to have been detected resulting in the fault isolator 103 performing stages C and D. The stages are depicted with ovals superimposed over lines of varying degrees of dashing beginning with a solid line. The different degrees of dashing represent actions occurring over time.

At stage C, the fault isolator 103 serially analyzes each clock object in order of the chip priorities until a fault can be isolated. First, the fault isolator 103 serially analyzes each of the clock objects 111 in the Priority 1 Chip Domain. For instance, the fault isolator 103 analyzes each clock object for a first processor chip. If the fault is not isolated, then the fault isolator 103 proceeds with analyzing each clock object of a second processor chip. If the fault is not isolated and all clock objects 111 have been analyzed, the fault isolator moves on to serially analyzing the clock objects 113 of the Priority 2 Chip Domain. Within each domain, the order of processing clock objects may be in accordance with any one of position of the corresponding chips, serial numbers, etc.

If the fault isolator 103 has not isolated the fault after completing serial analysis of clock objects 115 (assuming no other chip domains in the system), then the fault isolator 103 proceeds to stage D. At stage D, the fault isolator 103 concurrently analyzes the non-clock objects of the model 100 in order of chip domain priority. First, the fault isolator 103 concurrently analyzes non-clock objects 117A and non-clock objects 117B. The fault isolator 103 then proceeds to concurrently analyze the non-clock objects 119A and the non-clock objects 119B if the fault has yet to be isolated. If the fault is not isolated to a non-clock object in the Priority 2 Chip Domain, then the fault isolator proceeds with concurrently analyzing the non-clock objects 121A and the non-clock objects 121B.

This concurrent analysis is within node domains and/or between node domains. The concurrent analysis of non-clock objects is not required to be synchronized or simultaneous. And the degree of concurrency can vary based on currently available resources. For instance, the non-clock objects 117A represent non-clock objects for multiple processor chips of the node 105. The non-clock objects 117B represent non-clock objects of multiple processor chips of the node 107. Any one of configuration, policy, and system state may limit the fault isolator 103 to concurrently analyzing 4 objects. The fault isolator may be configured to concurrently analyze per node if the fault cannot already be isolated to the granularity of a particular node. In this situation, the fault isolator 103 may be constrained to concurrently analyzing the non-clock objects 117A until resources are available for analyzing the non-clock objects 117B. Embodiments may also allow fault isolation to move to a lower priority chip domain before completing a higher priority chip domain. For example, a fault isolator may have capability for 3 concurrent threads. If a thread completes analysis and no additional non-clock objects remain to be analyzed in a chip domain, the fault isolator can task the thread to analyze a non-clock object in a next lower level chip domain before analysis in the higher level chip domain completes.

Figure 3:
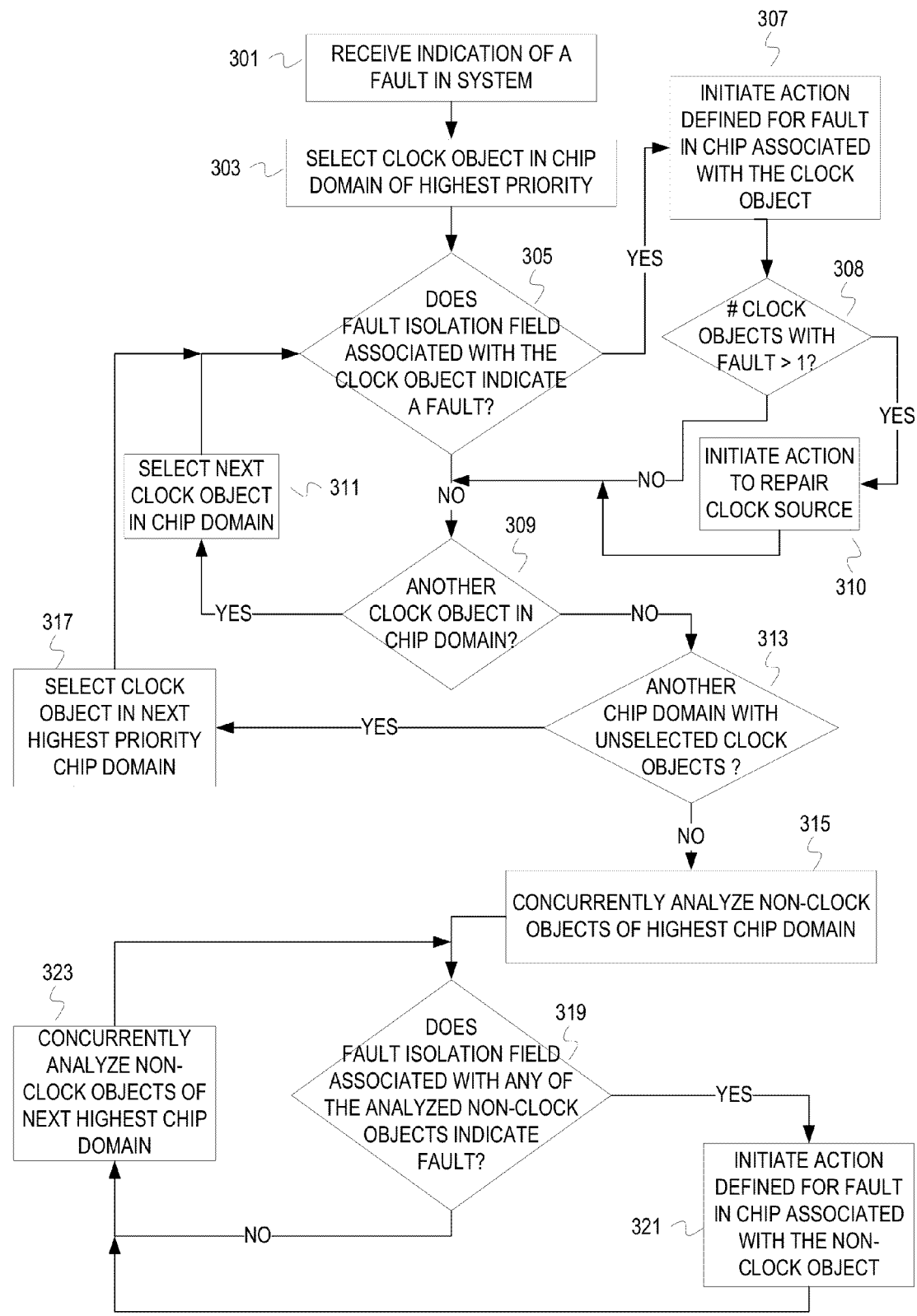
FIG. 3 depicts a flowchart of example operations for logical chip bifurcation based fault isolation.

FIG. 3 depicts a flowchart of example operations for logical chip bifurcation based fault isolation. The depicted operations are example operations and should not be used to limit the scope of the claims. For instance, embodiments may perform additional operations than those depicted to process different clock domains concurrently.

At block 301, an indication of a fault in a system is received. A fault may be detected during runtime with checkers that monitor operations of the system and/or runtime diagnostics. Faults may also be detected during system initialization. When a fault is detected the detecting entity notifies the fault isolator. For example, the detecting entity can generate an interrupt for a fault isolator. An interrupt handler invokes the fault isolator responsive to receiving the interrupt. For example, an interrupt may be generated in response to a checker or test code writing to a fault register field. As another example, the fault detector (e.g., checker or test code) can generate the interrupt or a message to a fault isolator coincident with detecting the fault. As stated earlier, a race type of scenario may occur that results in an interrupt for a later captured fault, which is probably a side-effect fault or echo fault, being reported before an earlier captured fault. The mechanism that handles the notification of the fault may queue subsequently received notifications or refuse acceptance of subsequently received notifications. Regardless of the how the notifications are handled, the faults have already been recorded (e.g., in the fault register fields).

At block 303, a clock object in a chip domain of highest priority is selected. The clock object can be defined to indicate any one or more of a chip type, chip identifier, and a domain identifier. The domain identifier may be one of four values in a system with four domains, for example. A fault isolator can select a clock object of a processor chip based on an identifier of the processor chip and an identifier of a node that contains the processor chip.

At block 305, it is determined whether a fault isolation field associated with the clock object indicates a fault. For instance, a fault isolator reads the clock object to determine a fault register and field of the fault register to read. If the determined fault register field has a non-zero value, then the fault isolator has found an origin of the fault and flow continues to block 307. If the fault isolator reads a default or zero value in the fault register field associated with the selected clock object, then flow continues to block 309.

At block 307, a repair action defined for the fault in a chip associated with the clock object is initiated. For example, a fault isolator reads a particular fault value from the fault register field referenced by the clock object. The fault isolator then determines the repair action mapped to the fault value read from the fault register field. The fault isolator may determine the repair action from the clock object or use the clock object to find the appropriate database entry of the chip associated with the clock object. The fault isolator executes code that implements the repair action or passes a reference to another entity that invokes the repair action code. Regardless of the specific entity initiating or performing the repair action, fault isolation continues while the repair action is performed. Thus, faults may be cleared from objects ahead of fault isolation reaching the objects.

At block 308, it is determined whether a number of clock objects having a fault is greater than 1. When faults occur across multiple clock objects in a clock domain, the faults can likely be isolated to a parent clock of a clock domain. In a system that has a clock source ("parent clock") that provides timing signals to local chip clocks ("child clocks") and synchronizes the child clocks, a fault isolator will analyze clock objects to determine whether the fault originates from the parent clock or one of the child clocks. Identifying faults in multiple clock objects of different chips indicates fault origin at the parent clock. Although this example diagnosis a clock source fault based on numbers alone, embodiments are not so limited. Embodiments can look at other attributes of the clock objects to determine whether the multiple faults across the clock objects corresponds to a clock source error. For example, an embodiment can factor in locations of the chips corresponding to the clock objects. If multiple clock objects have faults associated therewith and correspond to chips connected to receive child clock signals from different child clocks, then the fault can be considered as originating from the parent clock. In that case, a service request repair action will be initiated that indicates a fault with the parent clock. The fault isolator can determine chip connectivity/location from information in the system database or from the clocks objects if that information was written into the clock objects from the system database. If a clock object is associated with a fault and corresponds to a chip connected to the parent clock, then the fault can be isolated to the parent clock. Although this example flowchart uses a threshold of 1, the threshold for isolating a fault to a clock source can vary, and can vary in dependence upon chip location. If it is determined that the clock source is an origin of the fault, then control flows to block 310. Otherwise, control flows to block 309.

At block 310, a repair action for the clock source is initiated. For example, service is requested for the clock source. Control flows on to block 309.

If the fault was not yet isolated at block 305, then control flowed to block 309 where it is determined whether the current chip domain has another clock object. If there is another clock object in the chip domain, then control flows to block 311. Otherwise, control flows to block 313.

At block 311, a next clock object in the chip domain is selected. Controls flows from block 311 back to block 305.

If there was not another clock object in the current chip domain, it is determined whether there is another chip domain with unselected/unanalyzed clock objects at block 313. If there is another chip domain with unselected clock objects, then control flows to block 317. If there is not another chip domain with unselected objects, then control flows to block 315.

At block 317, a clock object in the next highest priority chip domain is selected. Control flows from block 317 back to block 305.

At block 315, non-clock objects of a highest chip domain are concurrently analyzed. For example, a fault isolator launches a process or thread for each non-clock object in the highest priority chip domain within the capability of the fault isolator. As another example, the fault isolator may task each of multiple cores with analyzing non-clock objects of the highest priority chip domain. The fault isolator can be configured to launch analysis across non-clock objects within a chip domain differently. For instance, a fault isolator can be configured to analyze at least one non-clock object from each node domain with available processing resources (e.g., thread or core). A fault isolator can be configured to instead use processing resources to concurrently analyze non-clock objects within a same node domain, before moving on to a next node domain. The repair actions initiated from analysis of the clock objects may have cleared the faults associated with the non-clock objects. In that case, the fault isolation has completed and the non-clock objects are not analyzed.

At block 319, it is determined whether a fault isolation field is associated with any one of the non-clock objects being analyzed. Effectively, block 319 is part of block 315. Each of the launched fault isolator threads will take up a non-clock object and examine the associated fault register field. If none of the fault register fields of the analyzed non-clock objects have an indication of a fault, then control flows to block 323. If one of the non-clock objects is associated with a fault register field that indicates a fault, then control flows to block 321.

At block 323, non-clock objects of a next highest chip domain are concurrently analyzed. Control flows from block 323 to block 319.

At block 321, a repair action defined for the fault in a chip associated with the non-clock object is initiated. For example, a fault isolator reads a particular fault value from the fault register field referenced by the non-clock object. The fault isolator then determines the repair action mapped to the fault value read from the fault register field. The fault isolator may determine the repair action from the non-clock object or use the non-clock object to find the appropriate database entry of the chip associated with the clock object. Control flows to block 323.

All of the clock objects depicted in FIG. 1 of the model 100 reside in a system wide clock domain because the example system 102 presumes a single clock source for the system 102. Embodiments, however, are not so limited. A system may have different clock sources that define different clock domains. In this case, a fault isolator can serially analyze clock objects within a domain while concurrently analyzing clock objects in other domains. Further, a different fault isolator (or fault isolator instance) can be responsible for a different clock domain.

Although the preceding examples describe a service processor embodying the fault isolation functionality, embodiments are not so limited. A system can be configured to elect or designate one of the processors to perform the functions/tasks described herein as performed by a service processor. A processor elected or designated to operate with fault isolation functionality may be removed from other program instruction processing.

The preceding examples also refer to a database that hosts information about a system from discovery during initialization. Embodiments are not limited to any particular database technology, and the term "database" is not intended to limit embodiments to a particular database application. The discovery information can be organized in any of a variety of data structures, arranged across a variety of memory elements (e.g., information for a chip is stored in cache nearest the chip), distributed throughout a system or stored in a monolithic structure, etc. Further, the description does not refer to a "model" and a "database" with intent to require a distinction between structure or arrangement of data for the abstracted objects and the discovery information. The different terminology was employed to distinguish between the information being stored for the system and for the fault isolator. The use of the different terms was not intended to require a difference between either the structure or the particular technology used to store the information.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for fault isolation based on bifurcated abstraction of chips into clock and non-clock objects as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
generating, for each of a plurality of chips in a system, a clock object and a non-clock object, wherein the clock object indicates at least one of data and program code for clock related functionality of the chip and the non-clock object indicates at least one of data and program code for functionality of the chip that is not related to clock functionality;
in response to a notification of a fault captured in the system,
serially analyzing each of the clock objects to determine captured faults associated with the clock objects;
for each of the clock objects determined to have a captured fault, initiating a repair action for the chip represented by the clock object; and
after said serially analyzing each of the clock objects, concurrently analyzing the non-clock objects to determine captured faults associated with the non-clock objects;
for each of the non-clock objects determined to have a captured fault, initiating a repair action for the chip represented by the non-clock object.

2. The method of claim 1, wherein said serially analyzing each of the clock objects comprises serially analyzing each of the clock objects in accordance with a prioritization that is based, at least in part, on a type of the chip corresponding to the clock object.

3. The method of claim 1 further comprising serially analyzing a different set of clock objects to determine captured faults associated with the different set of clock objects, wherein said serially analyzing the different set of clock objects is concurrent with said serially analyzing each of the clock objects, wherein the different set of clock object are in a first clock domain and the clock objects are in a second clock domain.

4. The method of claim 3, wherein the first clock domain and the second clock domain are defined by different clock sources.

5. The method of claim 1, wherein said concurrently analyzing the non-clock objects comprises analyzing the non-clock objects in accordance with a prioritization that is based, at least in part, on chip types corresponding to the non-clock objects.

6. The method of claim 5, wherein said analyzing the non-clock objects in accordance with the prioritization that is based, at least in part, on chip types corresponding to the non-clock objects comprises:
concurrently analyzing a first set of the non-clock objects each of which corresponds to a first chip type; and
after said concurrently analyzing the first set of the non-clock objects, concurrently analyzing a second set of the non-clock objects each of which corresponds to a second chip type, wherein the first chip type is defined with a higher priority than the second chip type.

7. The method of claim 1, wherein said generating the clock objects and the non-clock objects is based, at least partly, on information about the system discovered during system initialization.

8. A method comprising:
receiving notification of a fault in a system having a plurality of chips;
in response to the notification,
serially analyzing each of a first plurality of clock objects for indications of faults captured in the system and, for each of the first plurality of clock objects with an indication of a captured fault, initiating a repair action defined for the captured fault and the chip of the plurality of chips represented by the clock object, wherein the first plurality of clock objects represent clock aspects of a first set of the plurality of chips;
serially analyzing each of a second plurality of clock objects for indications of faults captured in the system and, for each of the second plurality of clock objects with an indication of a captured fault, initiating a repair action defined for the captured fault and the chip of the plurality of chips represented by the clock object, wherein the second plurality of clock objects represent non-clock aspects of a second set of the plurality of chips, wherein the first plurality of clock objects are serially analyzed prior to the second plurality of clock objects; and
after serially analyzing the first and the second plurality of clock objects,
concurrently analyzing a first plurality of non-clock objects for indications of captured faults,
for each of the first plurality of non-clock objects with an indication of a captured fault, initiating a repair action defined for the captured fault and for the chip represented by the non-clock object.

9. The method of claim 8, wherein the first plurality of clock objects have priority in fault isolation over the second plurality of clock objects based on chip types of the first and the second set of chips.

10. The method of claim 8 further comprising:
concurrently analyzing a second plurality of non-clock objects for indications of captured faults after said concurrently analyzing the first plurality of non-clock objects,
for each of the second plurality of non-clock objects with an indication of a captured fault, initiating a repair action defined for the captured fault and for the chip represented by the non-clock object of the second plurality of non-clock objects,
wherein the first plurality of non-clock objects have priority in fault isolation over the second plurality of non-clock objects based on chip types of the first set of chips, which are represented by the first plurality of non-clock objects, and the second set of chips, which are represented by the second plurality of non-clock objects.

11. A computer program product for fault isolation, the computer program product comprising:
 a non-transitory computer readable storage medium having computer usable program code embodied therewith, the computer usable program code comprising a computer usable program code configured to:
 generate, for each of a plurality of chips in a system, a clock object and a non-clock object, wherein the clock object indicates at least one of data and program code for clock related functionality of the chip and the non-clock object indicates at least one of data and program code for functionality of the chip that is not related to clock functionality;
 in response to a notification of a fault captured in the system,
  serially analyze each of the clock objects to determine captured faults associated with the clock objects;
  for each of the clock objects determined to have a captured fault, initiate a repair action for the chip represented by the clock object; and
  after analysis of the clock objects,
   concurrently analyze the non-clock objects to determine captured faults associated with the non-clock objects;
   for each of the non-clock objects determined to have a captured fault, initiate a repair action for the chip represented by the non-clock object.

12. The computer program product of claim 11, wherein the computer usable program code configured to serially analyze each of the clock objects comprises the computer usable program code configured to serially analyze each of the clock objects in accordance with a prioritization that is based, at least in part, on a type of the chip corresponding to the clock object.

13. The computer program product of claim 11 further comprising computer usable program code configured to serially analyze a different set of clock objects to determine captured faults associated with the different set of clock objects, wherein the program code is configured to serially analyze the different set of clock objects concurrently with serial analysis of each of the clock objects, wherein the different set of clocks objects are in a first clock domain and the clock objects are in a second clock domain.

14. The computer program product of claim 13, wherein the first clock domain and the second clock domain are defined by different clock sources.

15. The computer program product of claim 11, wherein the computer usable program code configured to concurrently analyze the non-clock objects comprises the computer usable program code configured to analyze the non-clock objects in accordance with a prioritization that is based, at least in part, on chip types corresponding to the non-clock objects.

16. The computer program product of claim 15, wherein the computer usable program code configured to analyze the non-clock objects in accordance with the prioritization that is based, at least in part, on chip types corresponding to the non-clock objects comprises the computer usable program code configured to:
 concurrently analyze a first set of the non-clock objects each of which corresponds to a first chip type; and
 after concurrent analysis of the first set of the non-clock objects, concurrently analyze a second set of the non-clock objects each of which corresponds to a second chip type, wherein the first chip type is defined with a higher priority than the second chip type.

17. The method of claim 11, wherein the computer usable program code configured to generate the clock objects and the non-clock objects is based, at least partly, on information about the system discovered during system initialization.

18. An apparatus comprising:
 a plurality of chips; and
 a service processor configured to,
 generate, for each of the plurality of chips, a clock object and a non-clock object, wherein the clock object indicates at least one of data and program code for clock related functionality of the chip and the non-clock object indicates at least one of data and program code for functionality of the chip that is not related to clock functionality;
 in response to a notification of a fault captured in the apparatus,
  serially analyze each of the clock objects to determine captured faults associated with the clock objects;
  for each of the clock objects determined to have a captured fault, initiate a repair action for the chip represented by the clock object; and
  after analysis of the clock objects,
   concurrently analyze the non-clock objects to determine captured faults associated with the non-clock objects;
   for each of the non-clock objects determined to have a captured fault, initiate a repair action for the chip represented by the non-clock object.

19. The apparatus of claim 18, wherein the plurality of chips comprises a processor chip, a memory chip, and an input/output hub chip.

20. The apparatus of claim 18, wherein the service processor configured to serially analyze each of the clock objects comprises the service processor configured to serially analyze each of the clock objects in accordance with a prioritization that is based, at least in part, on a type of the chip corresponding to the clock object.

* * * * *